United States Patent
Ogawa

(10) Patent No.: US 10,169,762 B2
(45) Date of Patent: Jan. 1, 2019

(54) RISK ANALYSIS DEVICE, RISK ANALYSIS METHOD AND PROGRAM STORAGE MEDIUM

(71) Applicant: NEC Corporation, Minato-ku, Tokyo (JP)

(72) Inventor: Ryuichi Ogawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 836 days.

(21) Appl. No.: 14/427,072

(22) PCT Filed: Sep. 3, 2013

(86) PCT No.: PCT/JP2013/005211
§ 371 (c)(1),
(2) Date: Mar. 10, 2015

(87) PCT Pub. No.: WO2014/041761
PCT Pub. Date: Mar. 20, 2014

(65) Prior Publication Data
US 2015/0348054 A1    Dec. 3, 2015

(30) Foreign Application Priority Data
Sep. 13, 2012  (JP) .................... 2012-201746

(51) Int. Cl.
*G06F 17/30* (2006.01)
*G06Q 30/00* (2012.01)
(Continued)

(52) U.S. Cl.
CPC ....... *G06Q 30/018* (2013.01); *G06Q 10/0635* (2013.01); *G06Q 50/18* (2013.01)

(58) Field of Classification Search
CPC .. G06Q 30/018; G06Q 10/0635; G06Q 50/18; G06Q 10/06375; G06Q 10/0631;
(Continued)

(56) References Cited

U.S. PATENT DOCUMENTS

| | | | |
|---|---|---|---|
| 6,857,020 B1* | 2/2005 | Chaar | G06Q 10/10 709/223 |
| 2003/0149657 A1* | 8/2003 | Reynolds | G06Q 10/06 705/38 |

(Continued)

FOREIGN PATENT DOCUMENTS

| | | |
|---|---|---|
| JP | 2001142986 A | 5/2001 |
| JP | 2001344384 A | 12/2001 |

(Continued)

OTHER PUBLICATIONS

International Search Report for PCT Application No. PCT/JP2013/005211, dated Oct. 1, 2013.

(Continued)

*Primary Examiner* — Evan Aspinwall

(57) ABSTRACT

The determination of legal or contractual risks in datacenter migration is performed by: storing business application information which is information about management of applications and data, applicable law information at a datacenter and contract information about a contract with a datacenter; extracting first migration information, which is information regarding datacenter migration, from business application information associated with a particular application and particular data which are migration targets; extracting second migration information, which is information regarding the datacenter migration, from applicable law information associated with a migration destination datacenter; extracting third migration information, which is information regarding the datacenter migration, from contract information associated with the migration destination datacenter; and comparing the first and second migration information with the third migration information.

12 Claims, 9 Drawing Sheets

| APP | MIGRATION ORIGIN DC | MIGRATION DESTINATION DC | DATA CLASS | LEGAL RISK | | CONTRACTUAL RISK | | | | OVERALL RISK DETERMINATION |
|---|---|---|---|---|---|---|---|---|---|---|
| | | | | DATA PROTECTION LAWS INCOMPLETENESS | JUDICIARY | MIGRATION DESTINATION | RESOURCE OCCUPATION | TERMINATION | SECURITY | |
| A1 | JAPAN-5 | JAPAN-3 | CLASSIFIED INFORMATION | | PRESENT | PRESENT | | | PRESENT | Alarm |
| A2 | JAPAN-5 | USA -4 | CLASSIFIED INFORMATION | | PRESENT | | PRESENT | | PRESENT | Alarm |
| | | | CLASSIFIED INFORMATION | | PRESENT | | | | | OK |
| A3 | KOREA-2 | SINGAPORE-1 | PERSONAL INFORMATION | PRESENT | | | | | | Alarm |
| A4 | GERMANY-3 | JAPAN-6 | PERSONAL INFORMATION | PRESENT | | | | | PRESENT | Alarm |
| | | | CLASSIFIED INFORMATION | | | | | | | OK |

(51) Int. Cl.
*G06Q 10/06* (2012.01)
*G06Q 50/18* (2012.01)

(58) Field of Classification Search
CPC ......... G06Q 10/06395; G06Q 10/0639; G06Q 10/06; G06Q 10/06312; G06Q 10/06316; G06Q 10/063; G06Q 10/0637; G06F 17/30563; G06F 11/0709; G06F 11/079; G06F 17/303; G06F 2209/5019
USPC ...................................................... 707/602
See application file for complete search history.

(56) References Cited

U.S. PATENT DOCUMENTS

| | | | | |
|---|---|---|---|---|
| 2006/0064555 | A1* | 3/2006 | Prahlad | G06F 3/0605 711/154 |
| 2006/0129771 | A1* | 6/2006 | Dasgupta | G06F 3/0605 711/162 |
| 2008/0077682 | A1* | 3/2008 | Nair | G06F 17/30115 709/223 |
| 2008/0222218 | A1* | 9/2008 | Richards | G06F 3/0605 |
| 2008/0222644 | A1* | 9/2008 | Richards | G06F 3/0605 718/104 |
| 2008/0262890 | A1* | 10/2008 | Korupolu | G06F 11/0793 705/7.22 |
| 2008/0295096 | A1* | 11/2008 | Beaty | G06F 9/4856 718/1 |
| 2013/0085742 | A1* | 4/2013 | Barker | G06F 9/5088 703/22 |

FOREIGN PATENT DOCUMENTS

| | | |
|---|---|---|
| JP | 2003-036323 A | 2/2003 |
| JP | 2003-099678 A | 4/2003 |
| JP | 2004110480 A | 4/2004 |
| JP | 4709876 B2 | 1/2010 |

OTHER PUBLICATIONS

Seiji Hayashi, "Infrastructure Service in Cloud Age", Fujitsu, Mar. 10, 2011, vol. 62, No. 2, pp. 236 to 241 Cited in ISR. English Abstract.

English translation of write opinion for PCT Application No. PCT/JP2013/005211.

* cited by examiner

Fig. 4

| APP | MIGRATION ORIGIN DC | MIGRATION DESTINATION DC | DATA CLASS | LEGAL RISK | | | CONTRACTUAL RISK | | | OVERALL RISK DETERMINATION |
|---|---|---|---|---|---|---|---|---|---|---|
| | | | | DATA PROTECTION LAWS INCOMPLETENESS | JUDICIARY | MIGRATION DESTINATION | RESOURCE OCCUPATION | TERMINATION | SECURITY | |
| A1 | JAPAN-5 | JAPAN-3 | CLASSIFIED INFORMATION | | PRESENT | PRESENT | | | PRESENT | Alarm |
| A2 | JAPAN-5 | USA-4 | CLASSIFIED INFORMATION | | PRESENT | | PRESENT | | PRESENT | Alarm |
| A3 | KOREA-2 | SINGAPORE-1 | CLASSIFIED INFORMATION | | PRESENT | | | | | OK |
| | | | PERSONAL INFORMATION | PRESENT | | | | | | Alarm |
| A4 | GERMANY-3 | JAPAN-6 | PERSONAL INFORMATION | PRESENT | | | | | PRESENT | Alarm |
| | | | CLASSIFIED INFORMATION | | | | | | | OK |

Fig. 5

```
APPLICATION ID : xxxxxxx
APPLICATION NAME: customer relation
BUSINESS: CUSTOMER MANAGEMENT
  MANAGING SECTION: SALES
DATA FILE NAME: customer1, customer2
  SCHEMA:  CUSTOMER ID, CUSTOMER NAME, MAIL ADDRESS,
           CONTACT ADDRESS,PURCHASED ITEM NAME, PURCHASING TIME,
           SUPPORT HISTORY
  DATA CLASS: PERSONAL INFORMATION
OPERATION:
  MIGRATION AREA: JAPAN, HONG KONG, NORTH AMERICA
  RESOURCE OCCUPATION: SERVER
  SECURITY: FILE ENCRYPTION PRESENT, ACCESS LOG PRESENT,
            MANAGEMENT AUTHORITY DIVISION PRESENT
```

Fig. 6

| AREA | PERSONAL INFORMATION AND PRIVACY PROTECTION LAW | CLASSIFIED INFORMATION PROTECTION LAW | EC DATA PROTECTION DIRECTIVE SAFE HARBOR AGREEMENT | JUDICIAL INVESTIGATIVE AUTHORITY LAW | JUDICIAL PROCEDURE LAW |
|---|---|---|---|---|---|
| KOREA | PERSONAL INFORMATION PROTECTION ACT | | | | |
| HONG KONG | PERSONAL DATA ORDINANCE | | | | |
| CHINA | | | | DATA RESTRICTION INVESTIGATION RIGHT ACT | |
| SINGAPORE | | | | | |
| AUSTRALIA | PRIVACY ACT | | | | |
| USA | FTC GUIDELINES | | Y | PATRIOT ACT | E-DISCOVERY ACT |
| EU ZONE | DATA PROTECTION DIRECTIVE | | | | |
| EU:GERMANY | FEDERAL DATA PROTECTION ACT | | | | |
| EU:FRANCE | DATA PROCESSING AND INDIVIDUAL LIBERTIES ACT | | | | |
| EU:UK | DATA PROTECTION ACT | | | REGULATION OF INVESTIGATORY POWERS ACT | |

Fig. 7

```
サービス(Services)
    内容(Service menu)
    運用規程(Operation rule)
        設置環境(Server setting)
        サービス品質保証(Service level agreement)
契約(Contract)
    期間(Terms)
    契約の変更(Alteration)
    解約(Termination)
支払い(Payment)
    料金(Service fee)
    品質保証未達成に基づく減額(Reimbursement)
契約者の義務(Obligation)
    禁止行為(Prohibited acts)
賠償(Compensation)
雑則(Miscellaneous)
    免責事項(Disclaimer)
    機密保持(Confidentiality)
    訴訟調停(Arbitration)
```

Fig. 8

```
SERVICE POLICY
RESOURCES: SERVER OCCUPATION  Y
            STORAGE OCCUPATION  Y
            NETWORK OCCUPATION  N

MIGRATION DESTINATION:
        REMIGRATION DESTINATION RANGE   JAPAN
                                        USA
                                        CANADA

SECURITY:   ENCRYPTION ALGORITHM  Y
            MONITORING METHOD  Y
            LOG COLLECTION METHOD  Y
            ID/ROLE MANAGEMENT  Y
            INCIDENT HANDLING MEASURES  Y
```

RISK ANALYSIS DEVICE, RISK ANALYSIS METHOD AND PROGRAM STORAGE MEDIUM

This application is a National Stage Entry of PCT/JP2013/005211 filed on Sep. 3, 2013, which claims priority from Japanese Patent Application 2012-201746 filed on Sep. 13, 2012, the contents of all of which are incorporated herein by reference, in their entirety.

TECHNICAL FIELD

The present invention relates to risk analysis technology, and in particular, relates to technology of analyzing legal or contractual risks in datacenter migration.

BACKGROUND ART

In recent years, services utilizing cloud computing have come into widespread use. Datacenters are generally used as an infrastructure for providing such services. Datacenters are located all over the world and provided by a large number of service providers.

Hereafter, an application software program is referred to simply as an "application".

It is often the case that a plurality of datacenters are used in operation of a service utilizing cloud computing. In such a case, migration of applications and data between datacenters is occasionally performed. At a time of such migration of applications and data, it is possible that a problem arises from a difference between the migration origin and the migration destination in operation rules about data operation and the like, a difference in applicable laws due to the difference between location countries for the datacenters, presence or absence of a contract with the datacenter provider with regard to these matters, and the like.

Specifically, when a law to be applied to data (for example, a law related to protection of personal information and privacy) exists at the migration origin but no law corresponding to the law exists at the migration destination, it is possible that no appropriate protection policy is taken with respect to data to be migrated. When an accident such as data leakage occurs at the migration destination datacenter as a result of that no appropriate protection policy has been taken there, if no measures against such an accident are explicitly prescribed in the contract with the migration destination datacenter, it is possible that a problem arises in terms of ex post measures, compensation and the like. For example, when migrating applications and data to a datacenter (cloud) located in a foreign country, with the aim of a cost reduction effect, great risk is involved in entrusting management of data requiring particular legal protection to a cloud provider not taking an appropriate measure. Inspecting in advance the occurrence of such a problem requires an enormous workload, because it is necessary to check a large number of matters including the contents of applications and data, contracts between datacenter providers, relevant laws in the country or area of the migration destination, and the like.

Already known are the following technologies for determining or inspecting risks of legal violation and of contractual incompleteness.

A contract information management system described in Patent Literature 1 (PTL 1) demands inputting a possibility (risk) of problem occurrence and determines a degree of the risk on the basis of the inputted information, in management of contractual coverage. Here, the risk is referred to as lack of a description of a legal clause which is to be prescribed in the contract.

An export management system described in Patent Literature 2 (PTL 2) includes a database storing relevant laws to be obeyed in exporting a product, such as the Export Control Order, and a database storing previous determination results on whether an export item violated a law, and thereby supports determining whether an export item or the like violates the relevant laws or not.

A law-observance condition inspection support system described in Patent Literature 3 (PTL 3) supports inspecting a law-observance condition in a business performed by the company, using a law-observance matrix consisting of a table of law themes and a check list of laws.

CITATION LIST

Patent Literature

PTL 1: Japanese Patent Application Laid-Open No. 2003-99678

PTL 2: Japanese Patent Application Laid-Open No. 2003-36323

PTL 3: Japanese Patent Publication No. 4709876

SUMMARY OF INVENTION

Technical Problem

The contract information management system described in the above-mentioned PTL 1 requires a user to input information representing a contract and the content of its risk. Accordingly, because it is required of a user to perform determination and input the determination result, there still is a problem in that the user is required to bear an enormous workload.

The export control system described in the above-mentioned PTL 2 displays previous determination results, results of determination by experts, texts of relevant laws, and the like, and then requests a user to input his/her determination on the presence or absence of violation of the relevant laws. Accordingly, because it is required of users including the experts to perform determination and input the determination results, there still is a problem in that the users are required to bear an enormous workload. There is also another problem in that, when no previous determination results exist, a user needs to perform determination by himself by means of such as referring to other information, and accordingly to bear a large load. The export control system described in PTL 2 has also a problem in that, because it does not determine whether an export item violates a law of the destination country or area for the export, determination of legal violation risks with respect to the export destination needs to be separately performed by another means.

The law-observance condition inspection system described in the above-mentioned PTL 3 requires a user to input a risk level with regard to laws and a condition for obeying the laws. Accordingly, because it is required of a user to input information about legal violation risks, there still is a problem in that the user is required to bear an enormous workload.

The main purpose of the present invention is to solve the problems described above, and accordingly to provide a risk analysis device, a risk analysis method and a program which reduce a workload of analysis and determination of legal or contractual risks in migration of applications and data between datacenters.

Solution to Problem

A risk analysis device according to the present invention to achieve the purpose, includes:

a storage means; a first migration information extraction means; a second migration information extraction means; a third migration information extraction means; and a migration risk determination means, wherein:

the storage means stores business application information which is information about management of applications and data, applicable law information at a datacenter and contract information about a contract with a datacenter;

the first migration information extraction means extracts first migration information, which is information regarding datacenter migration, from the business application information associated with a particular application and particular data which are migration targets;

the second migration information extraction means extracts second migration information, which is information regarding the datacenter migration, from the applicable law information associated with a migration destination datacenter;

the third migration information extraction means extracts third migration information, which is information regarding the datacenter migration, from the contract information associated with migration destination datacenter; and the migration risk determination means determines legal or contractual risks in datacenter migration, by comparing the first and second migration information with the third migration information.

A risk analysis method according to the present invention to achieve the purpose, includes:

extracting first migration information, which is information regarding datacenter migration, from business application information associated with a particular application and particular data which are migration targets;

extracting second migration information, which is information regarding the datacenter migration, from applicable law information;

extracting third migration information, which is information regarding datacenter migration, from contract information associated with a migration destination datacenter; and determining legal or contractual risks in datacenter migration, by comparing the first and second migration information with the third migration information.

A program according to the present invention to achieve the purpose, to allow a computer to execute, includes a process of:

extracting first migration information, which is information regarding datacenter migration, from business application information associated with a particular application and particular data which are migration targets;

extracting second migration information, which is information regarding the datacenter migration, from applicable law information;

extracting third migration information, which is information regarding datacenter migration, from contract information associated with a migration destination datacenter; and determining legal or contractual risks in datacenter migration, by comparing the first and second migration information with the third migration information.

Here, the objective is also achieved by means of a computer-readable storage medium storing the program.

Advantageous Effects of Invention

A risk analysis device, a risk analysis method and a program according to the present invention enable a user to easily analyze legal or contractual risks in datacenter migration.

BRIEF DESCRIPTION OF DRAWINGS

FIG. 4 is an example of a risk determination result outputted by the risk analysis device 100A according to the second exemplary embodiment FIG. 5 is a diagram showing an example of business application information.

FIG. 6 is a table showing an example of applicable law information.

FIG. 7 is a diagram showing an example of contract information.

FIG. 8 is a diagram showing an example of fourth migration information.

DESCRIPTION OF EMBODIMENTS

Next, exemplary embodiments of the present invention will be described in detail, with reference to drawings.

First Exemplary Embodiment

Figure 1:
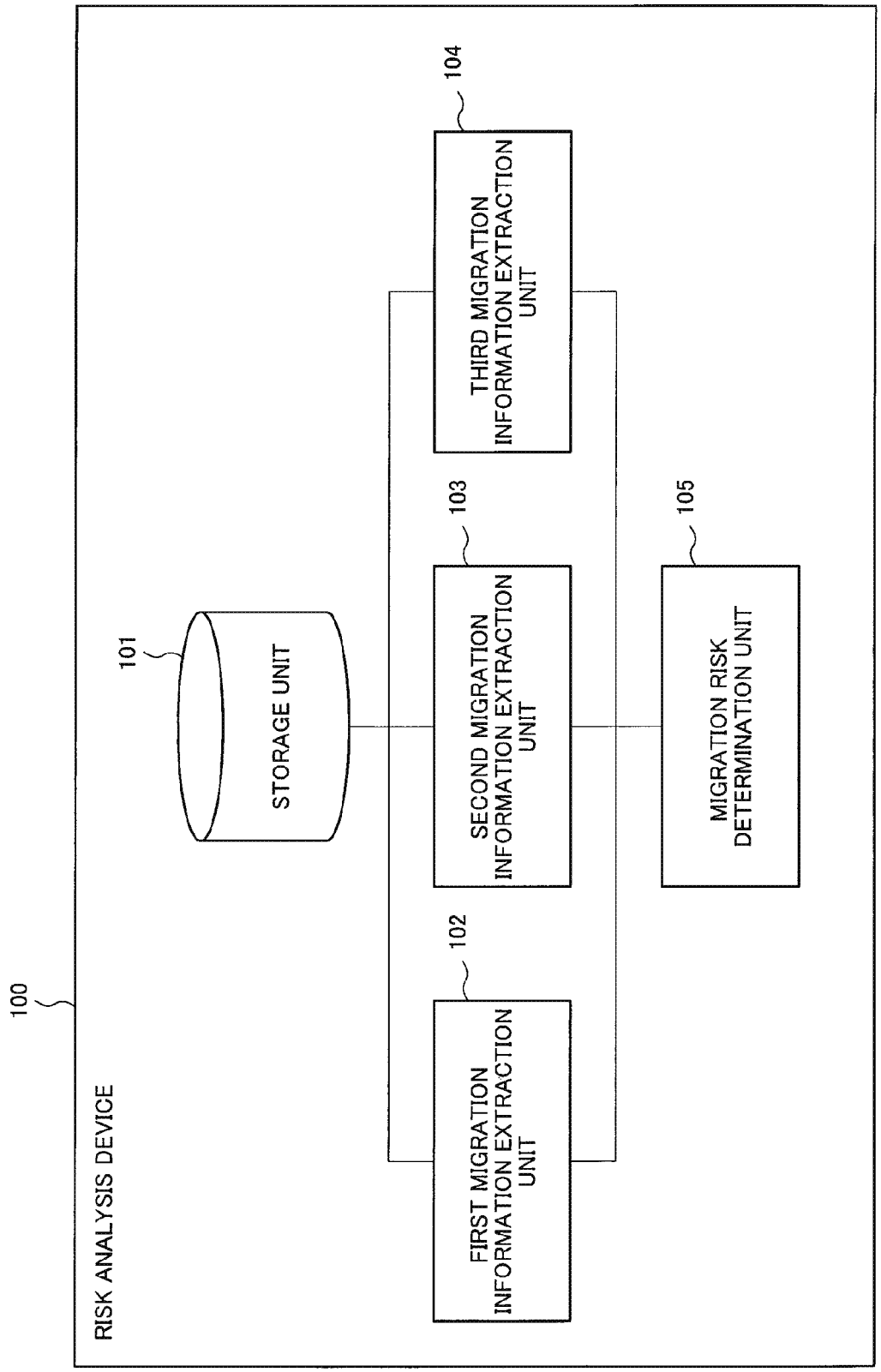
FIG. 1 is a diagram illustrating a configuration of a risk analysis device according to a first exemplary embodiment of the present invention.

FIG. 1 is a diagram illustrating a configuration of a risk analysis device according to a first exemplary embodiment of the present invention. A risk analysis device 100 according to the first exemplary embodiment of the present invention is provided with a storage unit 101, a first migration information extraction unit 102, a second migration information extraction unit 103, a third migration information extraction unit 104 and a migration risk determination unit 105.

The storage unit 101 stores business application information, which is information about management of applications and data, applicable law information at a datacenter (not illustrated), and contract information for the datacenter.

In the following descriptions, "information regarding migration" means primarily that it is information which influences analysis of risks in migration of applications or data between datacenters and information which is to be taken into consideration in the risk analysis. The "information regarding migration" is used in the analysis of legal or contractual risks in datacenter migration, by being extracted from the business application information, the applicable law information, the contract information, a service policy and the like, and then compared with each other.

The first migration information extraction unit 102 extracts first migration information, which is information regarding migration, from business application information associated with a particular application and particular data which are to be migration targets.

The second migration information extraction unit 103 extracts second migration information, which is information regarding migration, from applicable law information associated with a migration destination datacenter.

The third migration information extraction unit 104 extracts third migration information, which is information regarding migration, from contract information associated with the migration destination datacenter.

By comparing the first and second migration information with the third migration information, the migration risk determination unit 105 determines legal or contractual risks in the datacenter migration.

As has been described above, the risk analysis device 100 according to the first exemplary embodiment of the present invention enables a user to easily analyze legal or contractual risks in datacenter migration. It is because the migration risk determination unit 105 determines the risks on the basis of pieces of information regarding migration extracted from, respectively, the business application information, the applicable law information and the contract information.

Second Exemplary Embodiment

Next, a second exemplary embodiment of the present invention will be described.

Figure 2:
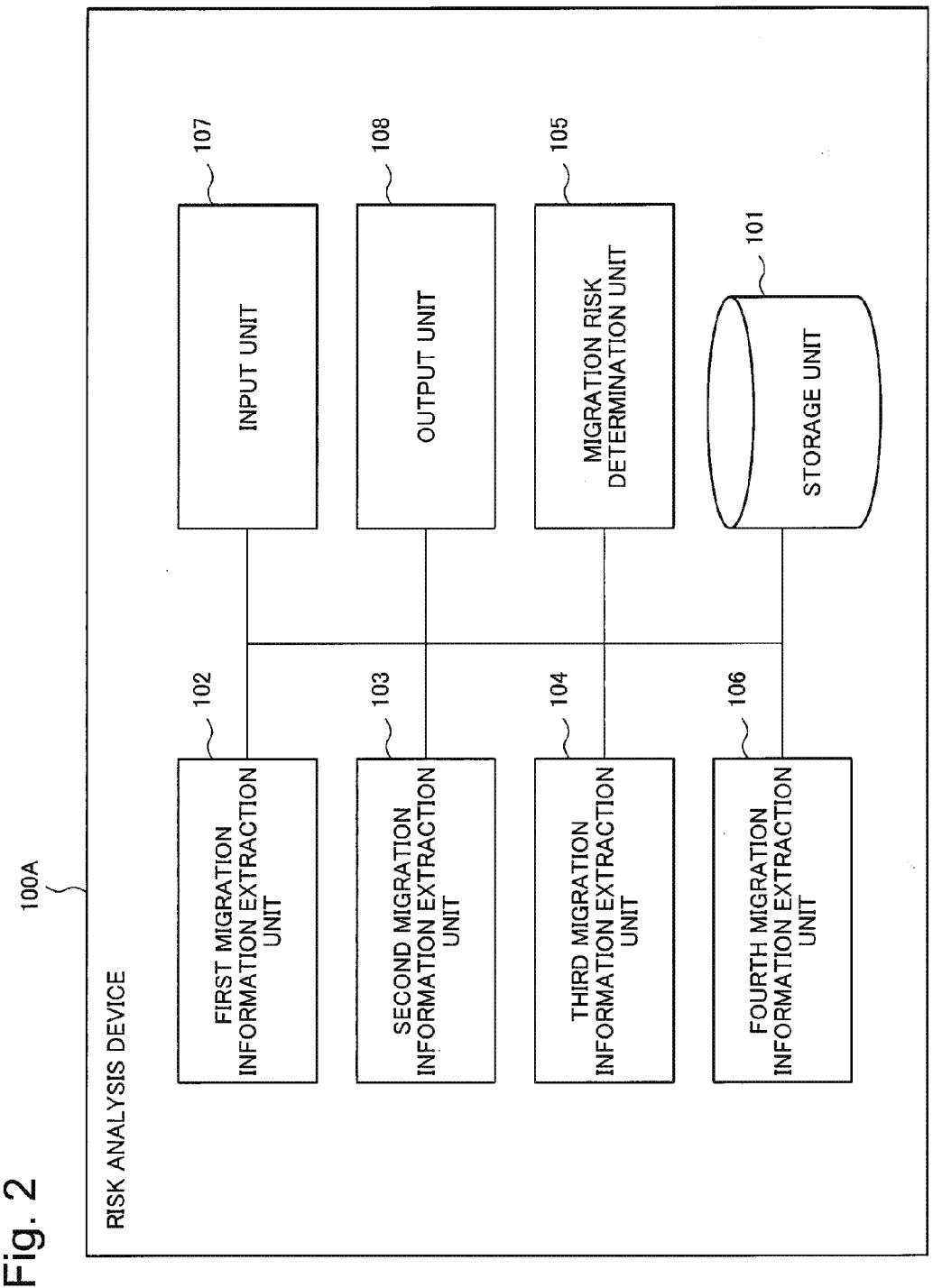
FIG. 2 is a diagram illustrating a configuration of a risk analysis device according to a second exemplary embodiment of the present invention.

FIG. 2 is a diagram illustrating a configuration of a risk analysis device according to the second exemplary embodiment of the present invention. A risk analysis device 100A according to the second exemplary embodiment of the present invention is provided with a storage unit 101, a first migration information extraction unit 102, a second migration information extraction unit 103, a third migration information extraction unit 104, a migration risk determination unit 105, a fourth migration information extraction unit 106, an input unit 107 and an output unit 108.

The storage unit 101 stores business application information, applicable law information, contract information and a service policy. The business application information includes information about the contents and configuration of an application and information about management and operation of data. The applicable law information is information about laws to be applied to data held by a datacenter (not illustrated) on the basis of the placement location (country or area) of the datacenter. The contract information is information representing the contents of a contract with a datacenter. The service policy is information representing service policies of the datacenter.

In migration of applications and data between datacenters, the first migration information extraction unit 102 extracts first migration information, which is information regarding the migration, from information about an application and data being targets of the migration, which is included in the business application information stored in the storage unit 101.

The second migration information extraction unit 103, in the migration of applications and data between datacenters, extracts second migration information, which is information regarding the migration, from the applicable law information stored in the storage unit 101. Specifically, the second migration information extraction unit 103 may extract applicable law information about the migration destination datacenter, as the second migration information.

The third migration information extraction unit 104, in the migration of applications and data between datacenters, extracts third migration information, which is information regarding the migration, from the contract information stored in the storage unit 101. Specifically, the third migration information extraction unit 104 may extract contract information about the migration destination datacenter, as the third migration information.

The fourth migration information extraction unit 106, in the migration of applications and data between datacenters, extracts fourth migration information, which is information regarding the migration, from the service policies stored in the storage unit 101. Specifically, the fourth migration information extraction unit 106 may extract a service policy of the migration destination datacenter, as the fourth migration information.

By comparing the first and second migration information with the third and fourth migration information, the migration risk determination unit 105 determines legal or contractual risks in the datacenter migration.

The input unit 107 is a device, such as a keyboard or a mouse, by which a user operates a computer.

The output unit 108 is a device, such as a display device or a printer device, which outputs results of the computer's processing.

The storage unit 101 may be realized by a storage medium such as a magnetic disk device or by a storage device such as a memory device.

The business application information stored in the storage unit 101 includes information (application configuration information) about the contents, configuration, data format, license and the like of an application for performing a business. As examples of the application configuration information, mentioned are the name of the application, the name of a business realized by the application (accounting management, ordering management, material management, customer management or the like), the name of a section managing the application, a list of files whose input/output is performed by the application, data items (schema) of the files, and the like.

The business application information stored in the storage unit 101 further includes information about data management and an operation method. As examples of such information, mentioned are a data class from the viewpoint of confidentiality (personal information, classified information or the like), a data protection measure such as encryption, a restriction on operation (an area to which migration can be directed, a security policy), and the like. Here, a class of confidential information may be expressed in detail in accordance with a business realized by each application. Such a class of confidential information is, for example, personnel information, customer information or the like with respect to personal information, and accounting information, design information, manufacturing information or the like with respect to classified information.

Pieces of such business application information are stored in the storage unit 101 in a manner to be associated with each application, each service consisting of a group of applications or each datacenter managing or operating applications. FIG. 5 is a diagram showing an example of business application information stored in the storage unit 101. FIG. 5 shows the contents of a piece of business application information which is stored as one of the records stored in the storage unit 101, which is a database. The business application information shown in FIG. 5 includes information indicating an application to be a migration target and information associated with the application. In that case, it is assumed that applications to be migration targets are specified and migration between datacenters is performed in terms of each of the specified applications. However, a way of migration may be other than that. For example, applications may be assembled into groups corresponding to respective businesses, and migration may be thereby performed in terms of each of the businesses each consisting of a plurality of applications. Alternatively, applications may be assembled into groups corresponding to respective sections, and migration may be thereby performed in terms of each of the sections, that is, each of the groups consisting of a plurality of applications. The business application information may have a configuration which includes information representing a migration target (business, section or the like) and information associated with it, depending on the ways of migration described above.

The applicable law information stored in the storage unit 101 includes information on laws to be possibly applied in relation to the business (operation of applications and data) and provision of services at a datacenter. As examples of such laws, mentioned are laws related to personal information protection (the Personal Data Protection Act in the United Kingdom, the Federal Data Protection Act in Germany, and the like), laws related to privacy protection (the Privacy Act in Australia, and the like), laws related to judicial procedures (the E-discovery (electronic information discovery) Act in the United States, and the like), laws related to judicial investigative authority (the Data Restriction Investigation Right Act in China, the Patriot Act in the United States, and the like), copyright protection laws, and the like.

In an area where no laws related to personal information protection and privacy protection have been established, there is a risk of incompleteness in management of data including personal information and customer information, or of difficulty in performing countermeasures and compensation in case of information leakage from the migration destination. In an area where a law related to judicial procedures has been established, there is a risk of bearing a large load of data evidence discovery in case of a lawsuit occurring in relation to a business in the area. In an area where a law related to judicial investigative authority has been established, there is a risk of receiving an order of compulsory discovery of confidential information migrated to the area.

Pieces of such applicable law information are stored in the storage unit 101 in a manner to be associated with each area (country) as laws each applied to a datacenter located in the area (country) of the law. FIG. 6 is a table showing an example of applicable law information stored in the storage unit 101. The applicable law information in FIG. 6 is constituted, using the area as a key, in a form of comprising pieces of information each about data protection-related laws which are to be possibly applied to a datacenter in the corresponding area. Here, the "EC Data Protection Directive Safe Harbor Agreement" in FIG. 6 is an agreement on that the data protection directive, which is effective within the EC (European Community) zone, permits migration of personal information to the outside of EC as an exception. In return for the permission to migrate personal information from EC, an area being a safe harbor (in FIG. 6, the United States) is obliged to implement a data protection policy equivalent to that of EC. Here, the areas and laws shown in FIG. 6 are the ones used for explaining the present invention, and accordingly, they do not necessarily represent correctly the actual areas and laws.

The contract information stored in the storage unit 101 includes the contents of a contract concluded between a datacenter user, who migrates his/her own applications and data to entrust their operation to a datacenter, and a datacenter provider who operates the datacenter. The contract information stored in the storage unit 101 also includes the contents of a contract to be concluded between a datacenter and another datacenter when the former datacenter migrates applications and data to re-entrust their operation to the latter datacenter for the purpose of performance retention, cost reduction or the like. Such contract information may include a sentence described in the written contract of a corresponding contract, as it is. FIG. 7 is a diagram showing an example of such contract information stored in the storage unit 101. The contract information in FIG. 7 represents an outline of a usage contract for a case where a datacenter provider A migrates applications and data to entrust their operation to a datacenter provider B in a foreign country. In the contract information in FIG. 7, in order to make them more understandable, the names of typical terms in a written contract are written in Japanese, and their English expressions are added in the parentheses. The contract information may be written in only Japanese or only English.

The service policy stored in the storage unit 101 is a list (service menu) of functions offered by a datacenter for management of applications and data. The service policy may include detailed rules (resource arrangement, service operation, security measures and the like) which are not explicitly specified in a datacenter usage contract. The service policy may be expressed by sentences or a list of detailed function items accompanied by information on each function's presence or absence. Such service policies are stored in the storage unit 101 in a manner to be associated with each datacenter.

Figure 3:
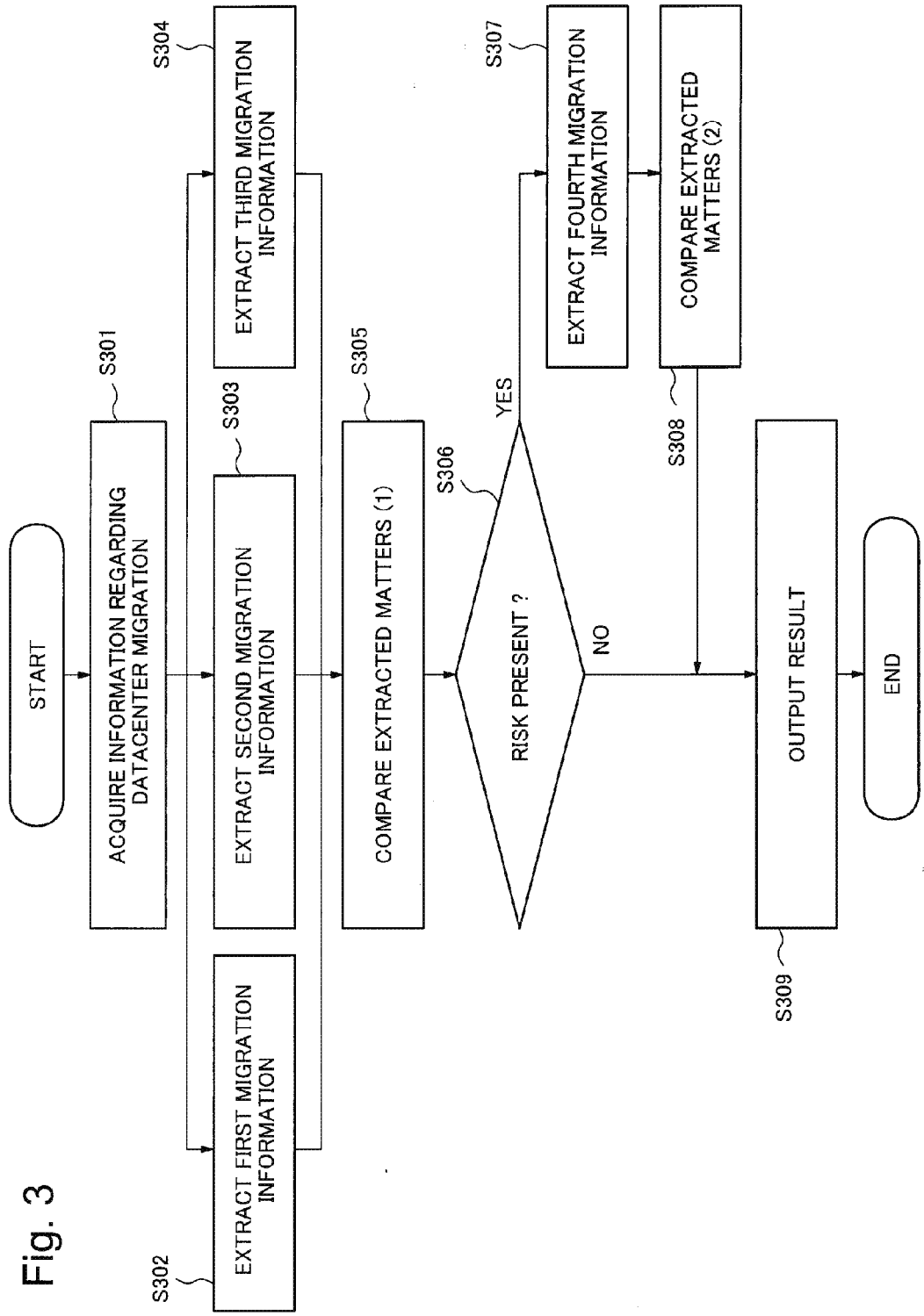
FIG. 3 is a flow chart illustrating operation of a risk analysis device 100A according to the second exemplary embodiment.

FIG. 3 is a flow chart illustrating operation of the risk analysis device 100A according to the second exemplary embodiment. With reference to FIG. 3, overall operation of the risk analysis device 100A will be described in detail below.

First, the risk analysis device 100A acquires information regarding a datacenter migration (step S301). Specifically, the risk analysis device 100A acquires information which specifies an application to be the migration target (for example, the application name, the name of a business of which the application is in charge, or the like) and information which specifies a datacenter to be the migration destination (for example, the datacenter provider name, the name of an area where the datacenter is located, or the like). A user may input such information specifying an application and a migration destination datacenter to the risk analysis device 100A by operating the input unit 107. Alternatively, the present step may be performed in a way where pieces of information each specifying an application and a migration destination datacenter, which were inputted in advance and stored in the storage unit 101, are read out from the storage unit 101 and then displayed, and a user subsequently makes selection from them by operating the input unit 107. Still alternatively, a cloud operation management system (not illustrated) may monitor the resource utilization condition, and for the purpose of utilization load reduction and service continuation in case of incident occurrence, may automatically input such information specifying an application and a migration destination datacenter on the basis a predetermined operation rule.

Next, the risk analysis device 100A extracts information regarding the migration from business application information, applicable law information the contract information (steps S302 to S304).

The first migration information extraction unit 102 extracts a relevant piece of business application information from among pieces of business application information stored in the storage unit 101, using a business or application to be the migration target as a key. From the extracted business application information, the first migration information extraction unit 102 further extracts first migration information (step S302). The first migration information represents matters having a possibility of causing a legal problem at a time of datacenter migration, which are potentially included in the applications and data being the migration targets.

With reference to FIG. 5, the process performed by the first migration information extraction unit 102 will be described below. Out of the information shown in FIG. 5, the first migration information extraction unit 102 extracts the class and protection methods for data with high confidentiality, referring to attributes of each of the business, data class and data protection methods.

In the example in FIG. 5,
   Data class: personal information
is resulted. The first migration information extraction unit 102 extracts also items regarding operation of the application. They correspond to restrictions on a migration destination. In the example in FIG. 5,
   Migration area: Japan, Hong Kong, North America
   Resource occupation: server
   Security: file encryption, access log, management authority division are extracted.

Here, the "migration area" indicates a range permitted to be a migration destination of the application. The "resource occupation: server" means that the application is not executed by the same physical server as that for executing other applications, but the application occupies a server, because of a reason in terms of security or performance. The "security: file encryption" means that output files are encrypted, and the "security: access log" means that a log of accesses to the output files is recorded. The "security: management authority division" means that an administrator at the migration origin can manage the application by accessing the migration destination datacenter with a limited privilege (that the management authority is clarified).

As a result, the first migration information extraction unit 102 obtains the followings, as the first migration information;
   Data class: personal information
   Migration area: Japan, Hong Kong, North America
   Resource occupation: server
   Security: file encryption, access log, management authority division.

The second migration information extraction unit 103 extracts information relevant the migration destination datacenter, from the applicable law information stored in the storage unit 101. From the extracted applicable law information, the second migration information extraction unit 103 further extracts second migration information, which is information regarding the migration (step S303).

The process performed by the second migration information extraction unit 103 will be described below, with reference to FIGS. 5 and 6. For example, when "Hong Kong" is designated as a migration destination according to the "migration area" in FIG. 5, the second migration information extraction unit 103 refers to the table in FIG. 6 stored in the storage unit 101. Then, the second migration information extraction unit 103 reads out the "Personal Data Ordinance" as the Hong Kong law related to personal information and privacy protection. In the table in FIG. 6, there is no law related to judicial investigative authority or judicial procedures for Hong Kong. It is also seen that Hong Kong is not a safe harbor from the EC law. As a result, the second migration information for Hong Kong turns out to be as follows;
   Personal information and privacy protection law: the Personal Data Ordinance
   EC safe harbor: NO (Hong Kong is not an EC safe harbor)
   Judicial procedure law: absent
   Judicial investigative authority law: absent.

When "the United States" is designated as a migration destination, the second migration information for the United States turns out to be as follows;
   Personal information and privacy protection law: the FTC guidelines
   EC safe harbor: YES
   Judicial procedure law: the E-discovery Act
   Judicial investigative authority law: the Patriot Act.

Further, when "Singapore" is designated as a migration destination, the second migration information for Singapore turns out to be as follows;
   Personal information and privacy protection law: absent
   EC safe harbor: NO
   Judicial procedure law: absent
   Judicial investigative authority law: absent In the above-described way, the second migration information extraction unit 103 extracts information regarding the datacenter migration from information about laws to be applied to the migration destination datacenter. When, among the above-described items, the item of personal information and privacy protection law indicates the presence of a law (that is, the item is not given "absence") or that of EC safe harbor is given "YES", it is determined that the risk of leakage is reduced because the situation results in enhancement of personal information protection. When the items of judicial procedure law and of judicial investigative authority law both indicate the existence of a law (that is, the items are not given "absence"), it is determined that the risk of being requested for compulsory discovery of confidential information by the judicature in the country or area is increased.

The third migration information extraction unit 104 extracts third migration information from the contract information stored in the storage unit 101, using information on the migration destination datacenter, which was already inputted, as a key (step S304). The third migration information is information into which information regarding the datacenter migration is extracted from the contents of a contract concluded with the migration destination datacenter. Here, the "information regarding datacenter migration" means information which mainly affects the analysis of risk in datacenter migration, as was already described above. That is, the third migration information may include not only contract contents based on assuming their effectiveness in datacenter migration (contents referring to datacenter migration) but also those corresponding to matters having a possibility of their being included in the first or second migration information.

Specifically, the above-mentioned "contract contents based on assuming their effectiveness in datacenter migration (contents referring to datacenter migration)" means, for example, contract contents such as the following one. "In case migration of data and applications to another datacenter occurs, First Party (the datacenter provider) and Second Party (the datacenter user) each shall bear 50% of the cost". The above-mentioned "contract contents corresponding to matters having a possibility of their being included in the first or second migration information" means, for example, contract contents such as the following one. "With respect to data designated by Second Party to be personal information, First Party shall perform management of predetermined security measures (for example, encryption)".

The third migration information includes information capable of being compared with matters included in the first and second migration information, in a process (described later) performed by the risk determination unit 105. The third migration information may be in a form of sentences including parts of sentences in the written contract, which are relevant matters having a possibility of being included in the first or second migration information and accordingly extracted from the sentences in the written contract. Alternatively, the third migration information may be information in a form of a list of matters having a possibility of being included in the first or second migration information, which is accompanied by information on whether or not each of the matters is described in the written contract.

The third migration information extraction unit 104 extracts the third migration information by performing the following checks on the terms and accompanying texts in the contract information. Here, titles of the checks shown below are based on the name of the terms in the contract information shown in FIG. 7. The following checks may be performed by simple keyword search or by another method such as text search using a dictionary of contract terminology or a thesaurus.

Services:
  Server setting: a check is performed on whether a text regarding server setting has a description of an installation site of a server to be used. If the installation site is not made explicit, it is possible that the migration is not directed to the area desired by the company being the migration origin.
  Service level agreement: a check is performed on whether a text regarding service level agreement has a description of data backup. If no such description is present, it is possible that data is lost in case of an accident such as a system failure.
Contract:
  Termination: a check is performed on whether a description of "return" or "erasure" with regard to data treatment after service termination is present or not. If no such description is present, it is possible that data remains at the migration destination even after service termination.
Miscellaneous:
  Confidentiality: a check is performed on, with regard to the migration data (confidential information owned by the service consignor), whether a description of a duty not to leak the data to any third party is present or not.
  Arbitration: confirmation is performed on a place of arbitration in case of occurrence of an accident such as information leakage. The place of arbitration usually is determined to be the country where the migration destination provider is located. In that case, the legal system of the country is applied to the arbitration. If no laws related to personal information protection or the like have been established in the country, the fact itself has a possibility to be a risk.

Performing the above-described checks on the contract information, the third migration information extraction unit 104 obtains the third migration information such as shown below, for example.
  Server setting: server installation site Singapore
  Service level agreement: description of data backup present
  Termination: description of data treatment absent
  Confidentiality: description of leakage prohibition present
  Arbitration: place of arbitration the United States Here, it is assumed that a risk on a place of arbitration is given as prior knowledge in a form of the presence or absence of a data protection legal system.

In the check result shown above, a risk of "description of data treatment absent" has been detected. While the installation site at a time of service termination is Singapore having no rules equivalent to a personal information protection law, the place of arbitration is the United States, and accordingly, personal information protection rules of the United States (in a plural number) are applied also to an accident in Singapore. For this reason, arbitration risk is eliminated here.

Here, the above-described checks are just typical examples, and check targets are not limited to the above-described items.

After performing the steps S302 to S304, the migration risk determination unit 105 compares the first and second migration information with the third migration information, and thereby determines legal or contractual risks in the datacenter migration (step S305). Specifically, the migration risk determination unit 105 compares the matters extracted into the first and second migration information with the third migration information. The migration risk determination unit 105 thereby determines whether or not the matters regarding businesses and laws included in the first and second migration information are included in the third migration information. If included, the migration risk determination unit 105 determines that, in terms of the matters regarding businesses and laws, there is no risk in the datacenter migration because the matters are included in the contents of the contract. If not included, the migration risk determination unit 105 determines that, in terms of the matters regarding businesses and laws, there is a risk in the datacenter migration because the matters are not included in the contents of the contract.

Hereinafter, a description will be given of details of the process of comparing the first and second migration information with the third migration information and of the risk determination process. In determining legal or contractual risks in the processes, the risk of each of the determination items is expressed by a flag. The value of each of the flags expresses risk absence and risk presence when it is 0 and 1, respectively. Here, unless particularly described, the initial value is 0 for each of the flags. The flags expressing risks of the respective determination items are collectively referred to as risk flags.

First, the migration risk determination unit 105 compares the "Data class" in the first migration information with the second migration information. For example, in the case of "Data class: personal information", if the item "Personal information and privacy protection law" in the second migration information is not blank, the migration risk determination unit 105 determines that a corresponding law (for example, the FTC guidelines) exists at the migration destination. Similarly, in the case of "Data class: classified information", if the item "Classified information protection law" in the second migration information is not blank, the migration risk determination unit 105 determines that a corresponding law exists at the migration destination. Here, in the applicable law information shown in FIG. 6, no law corresponding to such a classified information protection law is registered.

In contrast, if at least either of the items "Personal information and privacy protection law" and "Classified information protection law" corresponding to the respective data classes is blank, the migration risk determination unit 105 determines that there is incompleteness in data protection laws, and accordingly sets "data protection laws incompleteness flag=1".

If at least either of the items "Judicial procedure law" and "Judicial investigative authority law" is not blank, the migration risk determination unit 105 may determine that there is a risk of compulsory discovery or the like of personal information or classified information, and may accordingly set "judicial risk flag=1".

Next, the migration risk determination unit 105 compares the "Migration area" in the first migration information with the "Server setting" in the third migration information. If any installation site described in the "Server setting" is a site not included in the areas described in the "Migration area", the migration risk determination unit 105 determines that there is a risk of migration to an unintended migration destination, and accordingly sets "migration destination risk flag=1".

In the case of "data protection laws incompleteness flag=1", the migration risk determination unit 105 may further refer to the "Arbitration" in the third migration information. Then, if the place of arbitration is an area having a data protection law, the migration risk determination unit 105 may determine that arbitration risk related to incompleteness in data protection laws is eliminated, as already described above, and may accordingly set back the data protection laws incompleteness flag to be 0.

Next, when the "Data class" in the first migration information is personal information or classified information, if there is no description related to the "Termination" in the third migration information, the migration risk determination unit 105 determines that there is a leakage risk due to incompleteness of the contract, and accordingly sets "termination risk flag=1".

Next, the migration risk determination unit 105 compares the "Resource occupation" in the first migration information with each of the items in the third migration information. If there is no item comparable with the "Resource occupation", the migration risk determination unit 105 determines that there is a possibility of the resource occupation being impossible, and sets "resource occupation risk flag=1".

Next, the migration risk determination unit 105 compares the functions described in the "Security" in the first migration information with each of the items in the third migration information. If there is no comparable item for any one (or more) of the "Security" functions, the migration risk determination unit 105 determines that there is a possibility of some of the security measures implemented at the migration origin being unable to be implemented at the migration destination, and sets "security risk flag=1".

As a result of the above-described processes, the migration risk determination unit 105 obtains risk determination results shown below, for example.

Data protection laws incompleteness flag=0
Judicial risk flag=1
Migration destination risk flag=0
Resource occupation risk flag=1
Termination risk flag=1
Security risk flag=1

If, in the step S305, there is no matter having been determined to have a risk, that is, if all of the risk flag values are determined to be 0 (NO at a step S306), the process proceeds to a step S309.

If, in the step S305, there is any matter having been determined to have a risk, that is, if there is any risk flag having a value of 1 (YES at the step S306), the service policy is then referred to, and thereby performed is determination on whether the risk is eliminated or not.

The fourth migration information extraction unit 106 extracts a service policy associated with the migration destination datacenter from service policies stored in the storage unit 101. From the extracted service policy, the fourth migration information extraction unit 106 further extracts fourth migration information which is information regarding the datacenter migration (step S307). The extraction may be performed by keyword search or by search using a dictionary of datacenter operation-related terminology.

As the fourth migration information, for example, a service policy specialized in rules on the details, such as a resource arrangement rule, a remigration rule and a security function rule, is considered. The resource arrangement rule prescribes, for example, a condition for exclusive occupation of computation resources by an application. While physical resources are shared through virtualization in a cloud environment, there is a case where an application emphasizing performance and security needs to occupy the resources. The resource arrangement rule is necessary in such a case.

The remigration rule prescribes a range of remigration destinations in case of remigration of applications being necessary at the migration destination for a reason such as performance deterioration and an accident. If no remigration rule exists, there is a risk of remigration being directed to an undesired area.

The security function rule prescribes that the migration destination datacenter shall have security functions equivalent to those held by the migration origin datacenter. For example, the security functions include a data encryption method, a backup method, a monitoring method, a log collection method, an ID management method (such as one enabling a user side administrator to make access with the same privilege also at the migration destination), an incident handling method (such as one notifying also a user side administrator of a specific event), and the like. If such a security function rule cannot be confirmed to exist, there is a risk that the security level of the migration destination cannot satisfy the security level which has been guaranteed to the user of an application until the migration.

FIG. 8 is a diagram showing an example of the fourth migration information. That is, FIG. 8 shows information regarding migration included in the service policy of a particular datacenter. The "Resources" part shows whether the menus relating to resource occupation are offered or not. For example, "Y"s given at the "server occupation" and the "storage occupation" indicate that physical occupation of a server and storage is offered as menus at the datacenter. The country names given at the "remigration destination range" described in the "Migration destination" part represent countries included in the range of remigration destinations. The "Y" given at the "Security" part indicates that the security functions, such as an encryption algorithm, offered by the datacenter are of the same level (strength) as those by the migration origin datacenter.

That is, the fourth migration information is information into which service policies regarding datacenter migration are extracted from among service policies the migration destination datacenter can offer. Here, FIG. 8 shows just an example, and the fourth migration information may include other detail operation rules (such as backup, report and incident handling).

Next, the migration risk determination unit 105 refers to the risk flags and the fourth migration information, compares the first and second migration information with the fourth migration information, and thereby determines legal or contractual risks in the datacenter migration (step S308).

That is, the migration risk determination unit 105 compares the matters extracted into the first and second migration information with the fourth migration information. Then, the migration risk determination unit 105 determines whether or not the matters regarding businesses and laws included in the first and second migration information are included in the fourth migration information. If included, the migration risk determination unit 105 determines that there is no risk in the datacenter migration in terms of the matters regarding businesses and laws, because the matters are included in the service policies which can be offered by the migration destination datacenter. If not included, the migration risk determination unit 105 determines that there is a risk in the datacenter migration in terms of the matters regarding businesses and laws, because the matters are not included in the service policies which can be offered by the migration destination datacenter.

In the above-mentioned process, the migration risk determination unit 105 may refer to the risk flags instead of the first and second migration information. Hereinafter, a description will be given of a risk determination process performed by comparing the risk flags with the fourth migration information.

The migration risk determination unit 105 performs comparison of the items whose risk flag values are 1 with the fourth migration information. Here, the risk items represented by respectively the "data protection laws incompleteness flag" and the "judiciary risk flag" may be excluded from the comparison process, because the items are outside the scope of service policy. In the following process, comparison of the fourth migration information is made with the "termination risk flag", the "resource occupation risk flag", and the "security risk flag". Here, the present description will be continued assuming a case of comparing the risk flags obtained in the step S305 with the fourth migration information shown in FIG. 8. Referring to FIG. 8, no data erasure rule relating to "termination incompleteness" is included in the policies. Therefore, the migration risk determination unit 105 determines that the termination risk is not eliminated, and accordingly keeps "termination risk flag=1". Next, referring to FIG. 8, there is an item relating to "Resource occupation", where server occupation is shown to be possible. Therefore, the migration risk determination unit 105 determines that the resource occupation risk is eliminated, and accordingly sets back the resource occupation risk flag to be 0. Further referring to FIG. 8, it is indicated that the encryption algorithm, log collection method and ID/role management, as items relating to "Security", are equivalent to those of the migration origin datacenter. Therefore, the migration risk determination unit 105 determines that the "file encryption", "access log" and "management authority division" described in the "Security" part of the first migration information can be realized, and accordingly sets back the security risk flag to be 0.

As a result of the above-described process, the migration risk determination unit 105 obtains a risk determination result shown below.

Data protection laws incompleteness flag=0
Judiciary risk flag=1
Migration destination risk flag=0
Resource occupation risk flag=0
Termination risk flag=1
Security risk flag=0

On the basis of the risk flags obtained as above, the migration risk determination unit 105 may perform overall risk determination (to be migration OK, or to be problematic and raise an alarm). The overall risk determination may be performed by, for example, simply summing up the above-described risk flag values, and then comparing the sum with a predetermined threshold value to determine which is larger than the other. In the overall risk determination, a weight may be assigned to a particular flag. For example, in the above-mentioned summing up of the risk flag values, a certain one of the risk flag values may be made to be larger than the other ones. Alternatively, if any one of the risk flag values is 1, the migration risk determination unit 105 may automatically determine that there is a problem, and may accordingly raise an alarm.

The process subsequently proceeds to the step S309.

After completing the process of the step S305 or that of the step S308, the migration risk determination unit 105 outputs a result on the basis of the risk determination made in the step S305 and/or the step S308 (step S309). Specifically, a matter having been determined to have a risk in both of the steps S305 and S308 is finally determined to have a risk in the datacenter migration. A matter having been determined to have no risk in at least either of the steps S305 and S308 is finally determined to have no risk in the datacenter migration.

In the above-described risk determination process using the risk flags, the migration risk determination unit 105 determines a matter having been determined to be of "risk flag=1" to have a risk in the datacenter migration. A matter having been determined to be of "risk flag=0" is determined to have no risk in the datacenter migration. Here, the overall determination result is not changed.

Then, the risk analysis device 100A outputs the final result of the analysis of risks in the datacenter migration via the output unit 108, and ends the process.

Although, in the above description, the processes of the steps S307 and S308 are performed only when there is any matter having been determined to have a risk in the step S305 (that is, only if YES at the step S306), the processes may be performed regardless of whether such a matter exists or not.

Although, also in the above description, the comparison processes are performed separately in the two steps, S305 and S308, they may be performed together in a single step. That is, after performing the extraction processes in the steps S302, S303, S304 and S307, matters extracted into the first and second migration information may be compared with the third and fourth migration information.

The extraction processes by the first migration information extraction unit 102, the second migration information extraction unit 103, the third migration information extraction unit 104 and the fourth migration information extraction unit 106 may be performed by keyword extraction or by using a terminology dictionary, a thesaurus or the like. Keywords used in such a case may be inputted in advance and stored in the storage unit 101. The keywords may be read from the storage unit 101 and thereby be put into use at a time of the extraction processes. The keywords may be appropriately updated using the input unit 107.

Although it has been described above that, in the process of the step S309, a matter having been determined to have no risk in at least either of the steps S305 and S308 is determined to have no risk in the datacenter migration, the process may be different. For example, a predetermined matter may be determined finally to have no risk only when it has been determined to have no risk in both of the steps S305 and S308. Alternatively, the final risk determination on a predetermined matter may be made according to only the determination result in the step S305, regardless of that in the step S308. Alternatively, the final risk may be determined according to only the determination result in the step S308, regardless of that in the step S305.

FIG. 4 is an example of a risk determination result outputted by the risk analysis device 100A according to the second exemplary embodiment. The risk determination result in FIG. 4 is shown, for example, on a display device corresponding to the output unit 108. Alternatively, the risk determination result in FIG. 4 is printed out, for example, from a printer device corresponding to the output unit 108.

The "APP" in FIG. 4 represents the name of an application being the target of each migration. The "migration origin DC" in FIG. 4 represents the name of a datacenter presently operating the application or data being the target of each migration. The "migration destination DC" in FIG. 4 represents the name of a datacenter to be a migration destination for the application or data being the target of each migration. The "data class" in FIG. 4 represents a data class extracted from the first migration information. The "legal risk" in FIG. 4 represents the presence or absence of each of "data protection laws incompleteness" and "judiciary risk" determined by comparison between the first and second migration information. The "contractual risk" in FIG. 4 represents the presence or absence of each of "migration destination risk", "resource occupation risk", "termination risk" and "security risk" determined by comparison of the first migration information with the third migration information or with the fourth migration information. The "overall risk determination" in FIG. 4 represents an overall determination result on whether or not there is a risk in each datacenter migration ("Alarm" if present, and "OK" if absent). The "overall risk determination" may represent a result of the overall risk determination described above performed by the migration risk determination unit 105.

As has been described above, the risk analysis device 100A according to the second exemplary embodiment of the present invention enables a user to easily analyze legal or contractual risks in datacenter migration. It is because the migration risk determination unit 105 determines such risks on the basis of information regarding data migration extracted from the business application information, the applicable law information, the contract information and the service policies, and outputs the result.

The risk analysis device 100A according to the second exemplary embodiment of the present invention also reduces workload of an analysis of legal or contractual risks in datacenter migration. It is because a user does not need to determine whether or not business and legal matters having a possibility of causing a problem are described in a written contract (whether or not legal agreement has been concluded on the matters), because the determination is performed by comparing pieces of information extracted from the respective information with each other. It is also because the user does not need to investigate and determine by himself/herself whether the above-described matters can be dealt with by means of service policies offered by the migration destination datacenter, because the determination is performed by a comparison similar to that described above.

Figure 9:
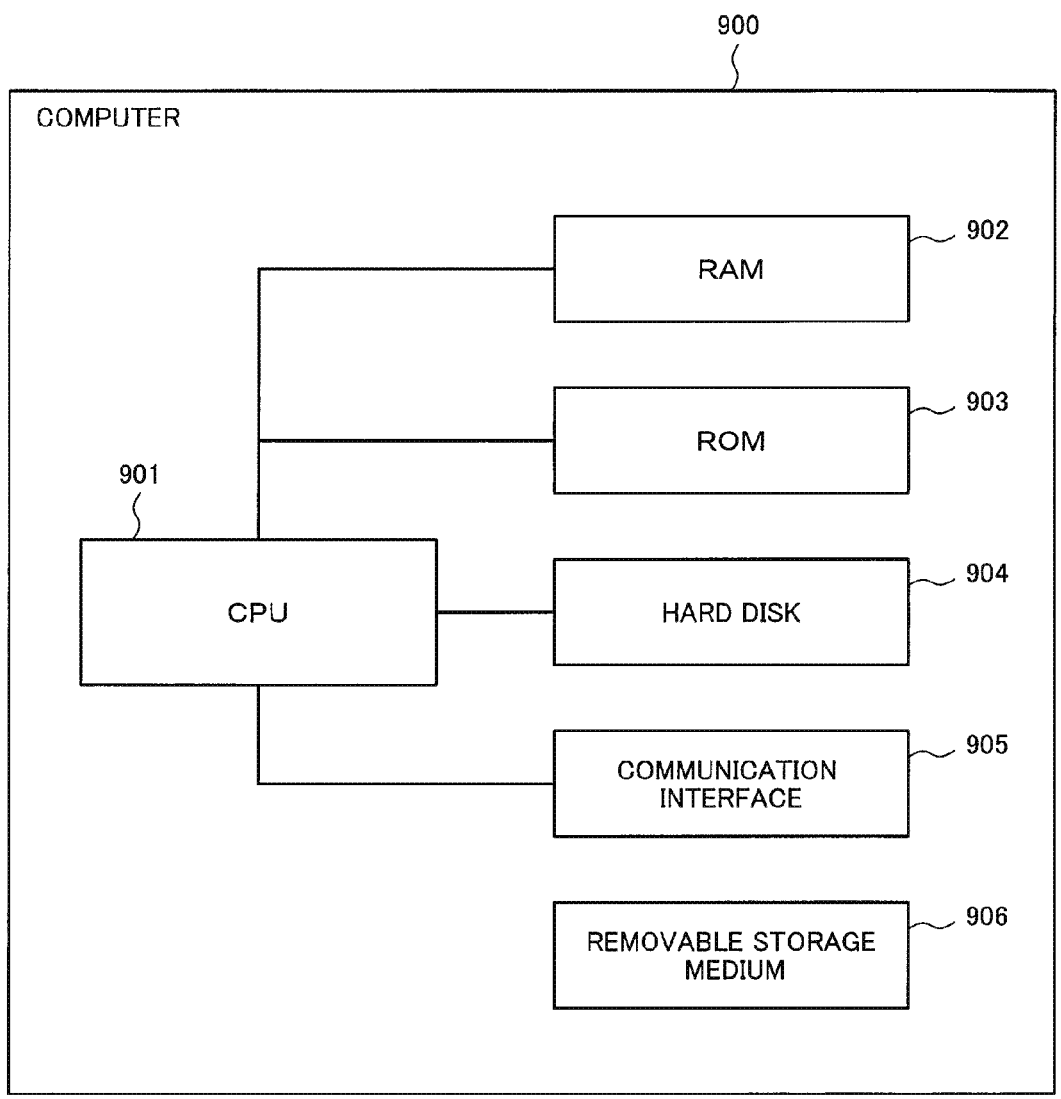
FIG. 9 is a block configuration diagram illustrating an example of components constituting a computer.

FIG. 9 is a block configuration diagram illustrating an example of components constituting a computer. A computer 900 in FIG. 9 includes a CPU (Central Processing Unit) 901, a RAM (Random Access Memory) 902, a ROM (Read Only Memory) 903, a hard disk 904, a communication interface 905 and a removable storage medium 906. The removable storage medium 906 may be a magnetic disk medium, an optical disk medium or a memory card, which are all attachable and detachable. Components of the above-described risk analysis devices 100 and 100A may be realized by executing a program in the CPU 901 of the computer 900. Specifically, the first migration information extraction unit 102, the second migration information extraction unit 103, the third migration information extraction unit 104, the migration risk determination unit 105 and the fourth migration information extraction unit 106, which are components illustrated in FIG. 1 or 2 already shown above, may be realized by the CPU 901 reading a program from the ROM 903, the hard disk 904 or the removable storage medium 906 and then executing the program, for example, similarly to the procedure of the flow chart shown in FIG. 3. In such a case, the present invention, which has been described taking the above-described exemplary embodiments as examples, is constituted by program code representing the computer program or by a storage medium storing the program code representing the computer program. The storage medium may be the hard disk 904 or the removable storage medium 906.

Alternatively, the first migration information extraction unit 102, the second migration information extraction unit 103, the third migration information extraction unit 104, the migration risk determination unit 105 and the fourth migration information extraction unit 106 may be realized by dedicated hardware. The risk analysis devices 100 and 100A may be such dedicated hardware including those components.

The present invention has been described above with reference to the exemplary embodiments, but the present invention is not limited to the above-described exemplary embodiments. To the configurations and details of the present invention, various changes which are understandable to those skilled in the art may be made within the scope of the present invention.

This application is based upon and claims the benefit of priority from Japanese Patent Application No. 2012-201746, filed on Sep. 13, 2012, the disclosure of which is incorporated herein in its entirety by reference.

REFERENCE SIGNS LIST 100, 100A risk analysis device
101 storage unit
102 first migration information extraction unit
103 second migration information extraction unit
104 third migration information extraction unit
105 migration risk determination unit
106 fourth migration information extraction unit
107 input unit
108 output unit
900 computer
901 CPU
902 RAM
903 ROM
904 hard disk
905 communication interface
906 removable storage medium

What is claimed is:

1. A risk analysis device, comprising:
a processor; storage hardware; an input device; and an output device, wherein
the storage hardware stores business application information which is information about management of applications and data, applicable law information at a datacenter and contract information about a contract with a datacenter and input from the input device; and the processor reads the business application information, the applicable law information and the contract information from the storage hardware, and configured to extract first migration information, which is information regarding datacenter migration, from the business application information associated with a particular application and particular data which are migration targets, extract second migration information, which is information regarding the datacenter migration, from the applicable law information associated with a migration destination datacenter input from the input device, extract third migration information, which is information regarding the datacenter migration, from the contract information associated with the migration destination datacenter, determine legal or contractual risks in datacenter migration, by comparing the first and second migration information with the third migration information, and output the legal or contractual risks via the output device, wherein the datacenter migration is performed as to the particular application and the particular data from the datacenter to the migration destination data center in accordance with results of comparing the first and second migration information with the third migration information, wherein the risk analysis device reduces risk analysis and determination workload in the datacenter migration.

2. The risk analysis device according to claim 1, wherein:
the storage hardware stores a service policy of a datacenter;
the processor is to extract fourth migration information, which is information regarding the datacenter migration, from the service policy associated with the migration destination datacenter; and
the processor is to determine legal or contractual risks in datacenter migration, by comparing the first and second migration information with the third and fourth migration information.

3. The risk analysis device according to claim 1, which, in the comparison, if a matter included in the first and second migration information is not included in the other information being compared, determines that there is a risk in datacenter migration in terms of the matter.

4. The risk analysis device according to claim 1, wherein the processor is to output a result of the determination.

5. A risk analysis method, comprising:
extracting, by a computing device, first migration information, which is information regarding datacenter migration, from business application information associated with a particular application and particular data which are migration targets;
extracting, by the computing device, second migration information, which is information regarding the datacenter migration, from applicable law information associated with a migration destination datacenter from an input device;
extracting, by the computing device, third migration information, which is information regarding the datacenter migration, from contract information associated with the migration destination datacenter;
determining, by the computing device, legal or contractual risks in datacenter migration, by comparing the first and second migration information with the third migration information;
outputting, by the computing device, the legal or contractual risks via an output device,
wherein the datacenter migration is performed as to the particular application and the particular data from the datacenter to the migration destination data center in accordance with results of comparing the first and second migration information with the third migration information, wherein the risk analysis method reduces risk analysis and determination workload in the datacenter migration.

6. The risk analysis method according to claim 5, further comprising:
extracting, by the computing device, fourth migration information, which is information regarding the datacenter migration, from a service policy associated with the migration destination datacenter; and
determining, by the computing device, legal or contractual risk in datacenter migration, by comparing the first and second migration information with the third and fourth migration information.

7. The risk analysis method according to claim 5, which, in the comparison, if a matter included in the first and second migration information is not included in the other information being compared, determines that there is a risk in datacenter migration in terms of the matter.

8. The risk analysis method according to claim 5, further comprising outputting, by the computing device, a result of the determination.

9. A non-transitory computer-readable storage medium storing a program that a computing device is to perform a process comprising:
extracting first migration information, which is information regarding datacenter migration, from business application information associated with a particular application and particular data which are migration targets;
extracting second migration information, which is information regarding the datacenter migration, from applicable law information associated with a migration destination datacenter from an input device;
extracting third migration information, which is information regarding the datacenter migration, from contract information associated with the migration destination datacenter;
determining legal or contractual risks in datacenter migration, by comparing the first and second migration information with the third migration information;
outputting the legal or contractual risks via an output device,
wherein the datacenter migration is performed as to the particular application and the particular data from the datacenter to the migration destination data center in accordance with results of comparing the first and second migration information with the third migration information, wherein the process reduces risk analysis and determination workload in the datacenter migration.

10. The non-transitory computer-readable storage medium according to claim 9, wherein the process further comprises:
extracting fourth migration information, which is information regarding the datacenter migration, from a service policy associated with the migration destination datacenter; and
determining legal or contractual risks in datacenter migration, by comparing the first and second migration information with the third and fourth migration information.

11. The non-transitory computer-readable storage medium according to claim 9, wherein the process further comprises determining, in the comparison, if a matter included in the first and second migration information is not included in the other information being compared, that there is a risk in datacenter migration in terms of the matter.

12. The non-transitory computer-readable storage medium according to claim 9, wherein the process further comprises outputting a result of the determination.

* * * * *